US011945981B1

(12) United States Patent
Geyer et al.

(10) Patent No.: US 11,945,981 B1
(45) Date of Patent: Apr. 2, 2024

(54) ADHESION OF SILICONE RUBBER TO THERMOPLASTICS

(71) Applicant: DOW SILICONES CORPORATION, Midland, MI (US)

(72) Inventors: Florian Geyer, Wiesbaden (DE); Michael Backer, Wiesbaden (DE)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 18/283,383

(22) PCT Filed: Mar. 29, 2022

(86) PCT No.: PCT/US2022/022245
§ 371 (c)(1),
(2) Date: Sep. 21, 2023

(87) PCT Pub. No.: WO2022/212304
PCT Pub. Date: Oct. 6, 2022

Related U.S. Application Data

(60) Provisional application No. 63/167,743, filed on Mar. 30, 2021.

(51) Int. Cl.
| | | |
|---|---|---|
| C09J 183/04 | (2006.01) | |
| B32B 27/28 | (2006.01) | |
| B32B 27/32 | (2006.01) | |
| B32B 37/12 | (2006.01) | |
| C08G 77/08 | (2006.01) | |
| C08G 77/18 | (2006.01) | |

(52) U.S. Cl.
CPC .......... C09J 183/04 (2013.01); B32B 27/283 (2013.01); B32B 27/32 (2013.01); B32B 37/1284 (2013.01); C08G 77/08 (2013.01); C08G 77/18 (2013.01); *B32B 2037/1253* (2013.01)

(58) Field of Classification Search
None
See application file for complete search history.

(56) References Cited

U.S. PATENT DOCUMENTS

| | | | |
|---|---|---|---|
| 3,419,593 A | 12/1968 | Willing | |
| 3,715,334 A | 2/1973 | Karstedt | |
| 3,772,122 A | 11/1973 | Young | |
| 3,814,730 A | 6/1974 | Karstedt | |
| 3,989,667 A | 11/1976 | Lee et al. | |
| 4,287,114 A | 9/1981 | Itoh et al. | |
| 5,504,174 A * | 4/1996 | Onishi ................. | C09D 183/04 525/478 |
| 5,942,583 A | 8/1999 | Azechi | |
| 5,973,067 A | 10/1999 | Nakamura et al. | |
| 5,985,371 A * | 11/1999 | Fujioka ................ | C09D 183/04 524/265 |
| 6,605,734 B2 | 8/2003 | Roy et al. | |
| 7,338,996 B2 | 3/2008 | Fehn et al. | |
| 7,575,655 B2 * | 8/2009 | Kuhn ...................... | C08L 83/14 156/329 |
| 8,691,910 B2 | 4/2014 | Hasegawa et al. | |
| 8,853,332 B2 | 10/2014 | Hasegawa et al. | |
| 8,859,693 B2 | 10/2014 | Hasegawa et al. | |
| 2002/0074086 A1 | 6/2002 | Nakamura et al. | |
| 2003/0116273 A1 * | 6/2003 | Nakamura ................. | C09J 5/02 156/330 |
| 2009/0227755 A1 | 9/2009 | DeVoe et al. | |
| 2018/0009951 A1 * | 1/2018 | Gubbels ................. | A61K 47/34 |
| 2020/0039195 A1 | 2/2020 | Giesen et al. | |

FOREIGN PATENT DOCUMENTS

| | | |
|---|---|---|
| JP | 2002173661 A | 6/2002 |
| WO | 2016103170 A1 | 6/2016 |
| WO | 2017140288 A1 | 8/2017 |
| WO | 2017147061 A1 | 8/2017 |
| WO | 2018152489 A1 | 8/2018 |
| WO | 2019169609 A1 | 9/2019 |

OTHER PUBLICATIONS

International Search Report for PCT/US2022/022245 dated Aug. 10, 2022, 3 pages.
"Recommendations on Food Contact Materials Section XV silicones [English Translation]", German Federal Institute for Risk Assessment (BfR), 2019, Berlin, DE.
"Recommendations on Food Contact Materials Section XV silicones", Bundesinstitut für Risikobewertung (BIR), 2017, Berlin, DE.
Wang, "Adhesion enhancement for liquid silicone rubber and different surface by organosilane and Pt catalyst at room temperature", Bull. Mater. Sci., 2013, pp. 1013-1017, 36(6), Indian Academy of Sciences.
Machine assisted English translation of JP2002173661A obtained from https://worldwide.espacenet.com/patent on Sep. 19, 2023, 17 pages.
Machine assisted English translation of JP2003201154A obtained from https://worldwide.espacenet.com/patent on Sep. 19, 2023, 11 pages.

* cited by examiner

*Primary Examiner* — Marc S Zimmer
(74) *Attorney, Agent, or Firm* — Warner Norcross + Judd LLP

(57) ABSTRACT

There is provided an adhesion mediator composition for use in the adhesion of silicone elastomers made from hydrosilylation curable silicone rubber compositions to thermoplastic substrates, especially polyolefin substrates. There is also provided a process for adhering silicone elastomers to thermoplastic substrates using the adhesion mediator composition. The adhesion mediator composition comprises: (i) a trialkoxysilane; (ii) a platinum group metal based hydrosilylation reaction catalyst; (iii) an alkoxy titanium compound; (iv) a tetraalkoxysilane; and (v): either (a') a polyorganosiloxane containing at least two unsaturated groups; or (b') a mixture of two or more polyorganosiloxanes containing at least two unsaturated groups. The method comprises the steps of: (a) optionally, activating a thermoplastic substrate surface; (b) treating the optionally activated thermoplastic substrate surface with the adhesion mediator composition; (c) applying a hydrosilylation curable silicone rubber composition on to the treated surface resulting from step (b); and (d) curing the hydrosilylation curable silicone rubber composition.

15 Claims, No Drawings

ADHESION OF SILICONE RUBBER TO THERMOPLASTICS

CROSS-REFERENCE TO RELATED APPLICATIONS

This application is the U.S. National Stage of PCT/US2022/022245 filed on 29 Mar. 2022 and claims priority to and all advantages of U.S. Provisional Application No. 63/167,743 filed on 30 Mar. 2021, the content of which is incorporated herein by reference.

The present disclosure relates to an adhesion mediator composition and its use in the adhesion of silicone elastomers made from hydrosilylation curable silicone rubber compositions to thermoplastic substrates, especially polyolefin substrates and a process for adhering said silicone elastomers to said thermoplastic substrates using the aforementioned adhesion mediator composition.

Hydrosilylation curable silicone rubber compositions cure to provide silicone elastomeric materials (otherwise referred to as silicone rubbers) via a hydrosilylation (addition) cure process.

Silicone elastomers which result from curing said hydrosilylation curable silicone rubber compositions may be used in a wide variety of applications including, for the sake of example, in electrical supply e.g., high-voltage electrical insulation, electronics, automotive applications, and consumer applications including e.g., food contact applications, because they have highly reliable properties.

In many such applications it has become increasingly desirable to manufacture molded composite parts comprising silicone elastomers and other materials such as thermoplastics, for example polyolefins. However, the preparation of such composites has proven difficult because of the lack of adhesion between silicone elastomers and many thermoplastics especially polyolefins which are chemically inert, do not have any polar functional groups, hydrophobic and, consequently, have a low surface energy. Due to the absence of these functionalities, common adhesives cannot build up adhesion with said thermoplastics through polar interactions, such as dipoles and/or hydrogen bonding and in most cases chemical bonding other than through processes such as radical grafting unless pre-activated in a suitable manner. Consequently, the ability to provide composites of silicone elastomer materials with said thermoplastic substrates such as polyolefins has been limited due to the inability to form sufficiently strong adhesive bonds between the two.

A variety of solutions have been proposed to make thermoplastic substrates more chemically reactive towards silicone elastomers such as in WO2016103170 in which the thermoplastic material is initially mixed with an oligomer having reactive groups and then having a silicone layer applied thereon. The intention being having a chemical interaction between the silicone elastomer surface and the reactive groups of the oligomer typically catalysed using an addition cure catalyst. However, such a process has been found to have a negative effect on the physical properties of the thermoplastic utilised.

The application of primers onto substrate surfaces, with or without prior activation of the substrate, was initially utilised to overcome this lack of adhesion issue. A primer is a preparatory coating applied on to a substrate and allowed to dry and/or cure to provide improved adhesion between the substrate and in this case a hydrosilylation curable silicone rubber composition subsequently applied thereon which provides enhanced adhesion between said substrate and the hydrosilylation curable silicone rubber composition. However, several problems have arisen using methods requiring primers. The use of primers for composite parts/articles are generally not preferred because they can be unreliable, can have quality control and reliability issues and traditionally contain high proportions of organic solvents which evaporate during the drying/curing process often resulting in undesirable volatile organic compound (VOC) environmental issues.

The use of such primers has proven particularly problematic with respect to the preparation of silicone elastomer/polyolefin composite parts/articles for use in highly regulated applications such as skin contact and food contact applications.

Composite parts/articles made from one or more thermoplastics such as polyolefins and one or more silicone elastomers are often prepared by way of injection molding processes including overmolding (e.g., injection molding hydrosilylation curable silicone rubber compositions over a thermoplastic substrate or 2K injection molding processes used when referring to molding both the thermoplastic and the hydrosilylation curable silicone rubber compositions into one composite silicone elastomer/polyolefin article or part by using a 2 k injection molding machine. Historically this has prevented the vast majority of primers from being utilised because of their ingredients, especially volatile organic solvents.

The aim of the present disclosure is to provide an adhesion mediator composition which is suitable for adhering a silicone elastomer to thermoplastic substrates especially polyolefin substrates.

There is provided an adhesion mediator composition comprising
 (i) A trialkoxysilane, of the formula $Si(OR)_3R^1$ wherein each R may be the same or different and is an alkyl group having at least two carbons per group and each $R^1$ may be the same or different and is an unsaturated group selected from an alkenyl group or an alkynyl group; which trialkoxysilane is present in an amount of from 20 to 45 wt. % of the composition;
 (ii) A platinum group metal based hydrosilylation reaction catalyst in which platinum group metal is present in an amount of from 0.1-1.5 wt. % of the composition;
 (iii) An alkoxy titanium compound having from 2 to 4 alkoxy groups in an amount of from 1 to 10 wt. % of the composition;
 (iv) A tetraalkoxysilane of the formula $Si(OR2)_4$, wherein each R 2 may be the same or different and is an alkyl group having at least two carbons per group, which tetraalkoxysilane is present in an amount of from 5 to 20 wt. % of the composition and
 (v) Either
  (a') a polyorganosiloxane containing at least two unsaturated groups, selected from alkenyl groups and alkynyl groups, per molecule and having a viscosity in a range of 50 mPa·s to 9000 mPa·s using a Brookfield™ viscometer with an RV-4 Spindle at 20 rpm at 25° C.; or
  (b') a mixture of two or more polyorganosiloxanes containing at least two unsaturated groups, selected from alkenyl groups and alkynyl groups, per molecule, which mixture has a viscosity in a range of 50 mPa·s to 9000 mPa·s using a Brookfield™ viscometer with an RV-4 Spindle at 20 rpm at 25° C.;
wherein said component (v) is present in an amount of from 25 to 60 wt. % of the composition.

The total weight % (wt. %) of the composition in any combination is 100 wt. %.

There is also provided a use of an adhesion mediator composition as hereinbefore described in the preparation of a silicone elastomer and thermoplastic composite.

There is also provided herein a method for the preparation of a composite of silicone elastomer and a thermoplastic, such as a polyolefin, comprising the steps of
  (a) optionally activating a thermoplastic substrate surface;
  (b) treating the optionally activated thermoplastic substrate surface with an adhesion mediator composition as hereinbefore described;
  (c) applying a hydrosilylation curable silicone rubber composition on to a treated surface resulting from step (b);
  (d) curing said hydrosilylation curable silicone rubber composition.

There is also provided a composite part or article obtained or obtainable from a method for the preparation of a composite of silicone elastomer and a thermoplastic such as a polyolefin, comprising the steps of
  (a) optionally activating a thermoplastic substrate surface;
  (b) treating the optionally activated thermoplastic substrate surface with an adhesion mediator composition as hereinbefore described;
  (c) applying a hydrosilylation curable silicone rubber composition on to the treated surface resulting from step (b);
  (d) curing said hydrosilylation curable silicone rubber composition.

Advantageously, the adhesion mediator composition provided herein can immediately be over molded and is designed to have no major volatile organic compounds (VOC) such as organic solvents. Hence the process utilising the present adhesion mediator composition is not reliant on a primer pre-cure treatment or evaporation of solvents and as such the adhesion mediator composition herein is not a primer because it functions differently. A standard primer is a preparatory coating applied on to a substrate and then in an essential step is left to dry and/or cure prior to addition of the next layer. In this disclosure the adhesion mediator composition does not undergo an essential drying/curing step to provide improved adhesion between the substrate and the silicone elastomer. Furthermore, there is no harmful or toxic solvent(s) contained in the composition designed to be evaporated as part of a drying process. In one embodiment the hydrosilylation curable silicone rubber composition is applied in step (c) before the layer of adhesion mediator applied in step (b) has cures or solidifies.

This significantly reduces environmental issues resulting from the release of volatile organic compounds (VOCs) often linked to the use of primers as well as regulatory issues like skin contact and food contact applications. Instead, a reactive diluent (component (v)) is employed which is non-volatile. The adhesion mediator as a whole will react and be incorporated in the LSR/molded article. Once the adhesion mediator composition has been applied onto the thermoplastic substrate, the hydrosilylation curable silicone rubber composition may be immediately applied on top of the adhesion mediator composition after which the hydrosilylation curable silicone rubber composition is cured at an appropriate temperature and pressure to form the composite part/article. The fact that the drying step is unnecessary has the additional effect of shorter processing times and higher productivity compared to common primer solutions.

Component (i) of the adhesion mediator composition is a trialkoxysilane, of the formula $$Si(OR)_3R^1$$

wherein each R may be the same or different and is an alkyl group having at least two carbons per group, alternatively from 2 to 20 carbons per group, alternatively from 2 to 15 carbons per group, alternatively from 2 to 10 carbons per group; alternatively, each R group may be selected from alkyl groups having 2 to 6 carbons per group such as ethyl, propyl, n-butyl, t-butyl, pentyl or hexyl; alternatively ethyl, propyl, n-butyl isobutyl or t-butyl, alternatively ethyl or propyl and each $R^1$ may be the same or different and is an unsaturated group selected from an alkenyl group or an alkynyl group, alternatively each $R^1$ may be the same or different and is an unsaturated group selected from an alkenyl group or an alkynyl group in either case having from 2 to 20 carbons per group, alternatively from 2 to 15 carbons per group, alternatively from 2 to 10 carbons per group; alternatively each R' is an alkenyl group which may be the same or different selected from vinyl, propenyl, n-butenyl, pentenyl or hexenyl.

In one embodiment component (i) the trialkoxysilane is present in an amount of from 20 to 40 wt. % of the adhesion mediator composition, alternatively from 25 wt. % to 38 wt. % of the adhesion mediator composition, alternatively from 25 wt. % to 35 wt. % of the adhesion mediator composition.

In a preferred embodiment Component (i) the trialkoxysilane is a trialkoxysilane, of the formula $Si(OR)_3R^1$ in which each R is an alkyl group having from 2 to 4 carbons per group such as ethyl, propyl, n-butyl isobutyl or t-butyl, alternatively ethyl or propyl and each $R^1$ is an alkenyl group which may be the same or different which has from 2 to 6 carbons per group such as vinyl, propenyl, n-butenyl, pentenyl or hexenyl; alternatively each $R^1$ is a vinyl group.

Component (ii) of the adhesion mediator composition is a platinum group metal based hydrosilylation cure catalyst. These are usually selected from catalysts of the platinum group of metals (platinum, ruthenium, osmium, rhodium, iridium and palladium), or a compound of one or more of such metals. Alternatively, platinum and rhodium compounds are preferred due to the high activity level of these catalysts in hydrosilylation reactions, with platinum compounds most preferred. In a hydrosilylation (or addition) reaction a hydrosilylation catalyst such as component (ii) herein catalyses the reaction between an unsaturated group, usually an alkenyl group e.g., vinyl with Si—H groups.

The catalyst (ii) can be a platinum group metal, a platinum group metal deposited on a carrier, such as activated carbon, metal oxides, such as aluminum oxide or silicon dioxide, silica gel or powdered charcoal, or a compound or complex of a platinum group metal. Preferably the platinum group metal is platinum.

Examples of preferred hydrosilylation catalysts (ii) are platinum based catalysts, for example, platinum black, platinum oxide (Adams catalyst), platinum on various solid supports, chloroplatinic acids, e.g., hexachloroplatinic acid (Pt oxidation state IV) (Speier catalyst), chloroplatinic acid in solutions of alcohols e.g., isooctanol or amyl alcohol (Lamoreaux catalyst), and complexes of chloroplatinic acid with ethylenically unsaturated compounds such as olefins and organosiloxanes containing ethylenically unsaturated silicon-bonded hydrocarbon groups, e.g., tetra-vinyl-tetramethylcyclotetrasiloxane-platinum complex (Ashby catalyst). Soluble platinum compounds that can be used include, for example, the platinum-olefin complexes of the formulae $(PtCl_2 \cdot (olefin))_2$ and $H(PtCl_3 \cdot olefin)$, preference being given in this context to the use of alkenes having 2 to 8 carbon atoms, such as ethylene, propylene, isomers of butene and of octene, or cycloalkanes having 5 to 7 carbon atoms, such as cyclopentene, cyclohexene, and cycloheptene. Other soluble platinum catalysts are, for the sake of example a platinum-cyclopropane complex of the formula $(PtCl_2C_3H_6)_2$, the reaction products of hexachloroplatinic acid with alcohols, ethers, and aldehydes or mixtures thereof, or the reaction product of hexachloroplatinic acid and/or its conversion products with vinyl-containing siloxanes such as methylvinylcyclotetrasiloxane in the presence of sodium bicarbonate in ethanolic solution —. Platinum catalysts with phosphorus, sulfur, and amine ligands can be used as well, e.g., $(Ph_3P)_2PtCl_2$; and complexes of platinum with vinylsiloxanes, such as sym-divinyltetramethyldisiloxane.

Hence, specific examples of suitable platinum-based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as $(COD)Pt(SiMeCl_2)_2$ where "COD" is 1,5-cyclooctadiene; and/or
(v) Karstedt's catalyst, a platinum divinyl tetramethyl disiloxane complex typically containing about 1 wt. % of platinum typically in a vinyl siloxane polymer. Solvents such as toluene and the like organic solvents have been used historically as alternatives but the use of vinyl siloxane polymers by far the preferred choice. These are described in U.S. Pat. Nos. 3,715,334 and 3,814,730. In one preferred embodiment component (ii) may be selected from co-ordination compounds of platinum. In one embodiment hexachloroplatinic acid and its conversion products with vinyl-containing siloxanes, Karstedt's catalysts and Speier catalysts are preferred.

The catalyst may be added as a single species or as a mixture of two or more different species. Typically, dependent on the form/concentration in which the catalyst is provided the amount of platinum group metal present, alternatively the amount of platinum metal present will be within the range of from 0.1-1.5 wt. % of the composition, alternatively from 0.1-1.0 wt. %, alternatively 0.1 to 0.5 wt. %, of the composition.

Component (iii) of the adhesion mediator composition is an alkoxy titanium compound having from 2 to 4 alkoxy groups, e.g., $Ti(OR^3)_4$, $Ti(OR^3)_3R^4$, $Ti(OR^3)_2R^4_2$ or a chelated alkoxy titanium molecule such as an ester of titanic acid and the enolate of acetoacetic ester; where $R^3$ is a linear or branched alkyl group having from 1 to 20 carbons, alternatively 1 to 15 carbons, alternatively 1 to 10 carbons, alternatively 1 to 6 carbons. Examples of $R^3$, include but are not restricted to methyl, ethyl, n-propyl, isopropyl, n-butyl, isobutyl, tertiary butyl, branched secondary alkyl groups such as 2, 4-dimethyl-3-pentyl. When present $R^4$ is an organic group such as an alkyl group having from 1 to 10 carbon atoms, an alkenyl group having from 2 to 10 carbon atoms, an alkynyl group having from 2 to 10 carbon atoms, a cycloalkyl group having from 3 to 10 carbon atoms, or an aromatic group having from 6 to 20 carbon atoms e.g., a phenyl group or a mixture thereof. Each $R^4$ may be the same or different and is selected from an alkyl group, an alkenyl group or an alkynyl group, alternatively an alkyl group, an alkenyl group, alternatively an alkyl group, in each case having up to 10 carbons, alternatively, up to 6 carbons per group. Examples of $R^4$ may include but are not restricted to methyl, ethyl, propyl, butyl, vinyl, cyclohexyl, phenyl, tolyl group.

Suitable examples of Component (iii) when $Ti(OR^3)_4$, $Ti(OR^3)_3R^4$, or $Ti(OR^3)_2R^4_2$ include for the sake of example, tetra methyl titanate, tetra ethyl titanate, tetra n-propyl titanate, tetra n-butyl titanate, tetra t-butyl titanate, tetraisobutyl titanate tetraisopropyl titanate. When Component (iii) is $Ti(OR^3)_3R^4$, examples include but are not limited to trimethoxy alkyl titanium, triethoxy alkyl titanium, tri n-propoxy alkyl titanium, tri n-butoxy alkyl titanium, tri t-butoxy alkyl titanium and tri isopropoxy alkyl titanate. When Component (iii) is a chelated titanium, it may comprise an ester of titanic acid and the enolate of acetoacetic ester.

In one embodiment Component (iii) may be selected from titanates of the structure $Ti(OR^3)_4$, $Ti(OR^3)_3R^4$, $Ti(OR^3)_2R^4_2$ where each $R^4$ may be as described above and $R^3$ is an isobutyl group or n-butyl group or component (iii) is an ester of titanic acid and the enolate of acetoacetic ester.

Component (iii) of the adhesion mediator composition i.e., the alkoxy titanium compound having from 2 to 4 alkoxy groups, maybe present in an amount of from 1 to 10 wt. % of the composition, alternatively from 2 to 8 wt. %, alternatively from 2 to 7 wt. % of the composition.

Component (iv) of the adhesion mediator composition is a tetraalkoxysilane of the formula $Si(OR^2)_4$ wherein each R 2 may be the same or different and is an alkyl group having at least two carbons per group, alternatively an alkyl group having from 2 to 20 carbons per group, alternatively from 2 to 15 carbons per group, alternatively from 2 to 10 carbons per group, alternatively is ethyl, propyl, isopropyl, n-butyl, isobutyl, t-butyl, pentyl or hexyl, alternatively ethyl, propyl, isopropyl, n-butyl, isobutyl, t-butyl; Component (iv) is present in the adhesion mediator composition in an amount of from 5 to 20 wt. % of the composition, alternatively from 5 to 15 wt. %, alternatively from 7 to 15 wt. %.

Component (v)

Component (v) of the adhesion mediator composition is either
(a') a polyorganosiloxane containing at least two unsaturated groups, selected from alkenyl groups and alkynyl groups, per molecule and having a viscosity in a range of 50 mPa·s to 9000 mPa·s using a Brookfield™ viscometer with an RV-4 Spindle at 20 rpm at 25° C.; or
(b') a mixture of two or more polyorganosiloxanes containing at least two unsaturated groups, selected from alkenyl groups and alkynyl groups, per molecule, which mixture has a viscosity in a range of 50 mPa·s to 9000 mPa·s using a Brookfield™ viscometer with an RV-4 Spindle at 20 rpm at 25° C.;
wherein said component (v) is present in an amount of from 25 to 60 wt. % of the composition.

In both (v)(a') the polyorganosiloxane containing at least two unsaturated groups, selected from alkenyl groups and alkynyl groups, per molecule and in (v)(b') the mixture of two or more polyorganosiloxanes containing at least two unsaturated groups, selected from alkenyl groups and alkynyl groups, per molecule, has a viscosity in a range of 50 mPa·s to 9000 mPa·s using a Brookfield™ viscometer with an RV-4 Spindle at 20 rpm at 25° C.; alternatively a viscosity in a range of 100 mPa·s to 9000 mPa·s using a Brookfield™ viscometer with an RV-4 Spindle at 20 rpm at 25° C.; alternatively a viscosity in a range of 100 mPa·s to 8000 mPa·s using a Brookfield™ viscometer with an RV-4

Spindle at 20 rpm at 25° C.; alternatively a viscosity in a range of 100 mPa·s to 7500 mPa·s using a Brookfield™ viscometer with an RV-4 Spindle at 20 rpm at 25° C.; alternatively a viscosity in a range of 100 mPa·s to 7000 mPa·s using a Brookfield™ viscometer with an RV-4 Spindle at 20 rpm at 25° C.; alternatively a viscosity in a range of 200 mPa·s to 7000 mPa·s using a Brookfield™ viscometer with an RV-4 Spindle at 20 rpm at 25° C.; alternatively a viscosity in a range of 300 mPa·s to 5000 mPa·s using a Brookfield™ viscometer with an RV-4 Spindle at 20 rpm at 25° C.

In the case of (v)(b') the mixture may comprise polyorganosiloxanes containing at least two unsaturated groups, selected from alkenyl groups and alkynyl groups, per molecule and having a viscosity in a range of 50 mPa·s to 60,000 mPa·s at 25° C., alternatively 50 mPa·s to 25,000 mPa·s at 25° C., 100 mPa·s to 25,000 mPa·s at 25° C., alternatively 100 mPa·s to 15,000 mPa·s at 25° C., alternatively 100 mPa·s to 10,000 mPa·s at 25° C., providing the viscosity of the resulting mixture has a viscosity in a range of 50 mPa·s to 9000 mPa·s using a Brookfield™ viscometer with an RV-4 Spindle at 20 rpm at 25° C., in an amount of from 25 to 60 wt. % of the composition, alternatively in an amount of from 30 to 60 wt. % of the composition, alternatively in an amount of from 35 to 55 wt. % of the composition. The viscosity of individual polymers in (v)(b') having a viscosity greater than 10,000 mPa·s measured at 25° C. may be measured using a Brookfield™ rotational viscometer with spindle LV-4 (designed for viscosities in the range between 10,000-2,000,000 mPa·s) adapting the speed according to the polymer viscosity for example at 6 rpm.

Each polyorganosiloxane of component (v) is a polydiorganosiloxane having at least two unsaturated groups per molecule, which unsaturated groups are selected from alkenyl or alkynyl groups. Alternatively, each polyorganosiloxane of component (v) has at least three unsaturated groups per molecule.

The unsaturated groups of each polyorganosiloxane of component (v) may be terminal, pendent, or in both locations. Alkenyl groups may have 2 to 30, alternatively 2 to 24, alternatively 2 to 20, alternatively 2 to 12, alternatively 2 to 10, and alternatively 2 to 6 carbon atoms. Alkenyl is exemplified by, but not limited to, vinyl, allyl, methallyl, propenyl, and hexenyl and cyclohexenyl groups. Alkynyl may be exemplified by, but not limited to, ethynyl, propynyl, and butynyl groups. Alkynyl groups may have 2 to 30, alternatively 2 to 24, alternatively 2 to 20, alternatively 2 to 12, alternatively 2 to 10, and alternatively 2 to 6 carbon atoms.

Each polyorganosiloxane of component (v) has multiple units of the formula (I):

$$R'_a SiO_{(4-a)/2} \qquad (I)$$

in which each R' is independently selected from an aliphatic hydrocarbyl, or aliphatic non-halogenated organyl group (that is any aliphatic organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to the alkenyl groups and alkynyl groups described above. The aliphatic non-halogenated organyl groups are exemplified by, but not limited to, suitable nitrogen containing groups such as amido groups, imido groups; oxygen containing groups such as polyoxyalkylene groups, carbonyl groups, alkoxy groups and hydroxyl groups. Further organyl groups may include sulfur containing groups, phosphorus containing groups, boron containing groups. The subscript "a" is 0, 1, 2 or 3.

Siloxy units may be described by a shorthand (abbreviated) nomenclature, namely—"M," "D," "T," and "Q", when R' is as described above, alternatively an alkyl group, typically a methyl group (further teaching on silicone nomenclature may be found in Walter Noll, Chemistry and Technology of Silicones, dated 1962, Chapter I, pages 1-9). The M unit corresponds to a siloxy unit where a=3, that is $R'_3SiO_{1/2}$; the D unit corresponds to a siloxy unit where a=2, namely $R'_2SiO_{2/2}$; the T unit corresponds to a siloxy unit where a=1, namely $R'_1SiO_{3/2}$; the Q unit corresponds to a siloxy unit where a=0, namely $SiO_{4/2}$. Each polyorganosiloxane of component (v) is substantially linear but may contain a proportion of branching due to the presence of T units (as previously described) within the molecule, hence the average value of a in structure (I) is about 2.

Examples of typical groups on each polyorganosiloxane of component (v) as described above include at least two unsaturated groups, selected from alkenyl groups and alkynyl groups, per molecule typically alkenyl groups and having a viscosity in a range as described above include mainly alkenyl, alkynyl and/or alkyl groups, alternatively alkenyl, and/or alkyl groups. The groups may be in pendent position (on a D or T siloxy unit) or may be terminal (on an M siloxy unit).

Each polyorganosiloxane of component (v) may be selected from polydimethylsiloxanes, alkylmethylpolysiloxanes, alkylarylpolysiloxanes or copolymers thereof (where reference to alkyl means any suitable alkyl group, alternatively an alkyl group having two or more carbons) containing e.g., alkenyl and/or alkynyl groups and may have any suitable terminal groups, for example, they may be trialkyl terminated, alkenyldialkyl terminated alkynyldialkyl terminated or may be terminated with any other suitable terminal group combination providing each polymer contains at least two unsaturated groups selected from alkenyl and alkynyl groups per molecule. In one embodiment the terminal groups of such a polymer does not comprise any silanol terminal groups.

Hence each polyorganosiloxane of component (v) may, for the sake of example, be: a dialkylalkenyl terminated polydimethylsiloxane, e.g., dimethylvinyl terminated polydimethylsiloxane; a dialkylalkenyl terminated dimethylmethylphenylsiloxane, e.g., dimethylvinyl terminated dimethylmethylphenylsiloxane; a trialkyl terminated dimethylmethylvinyl polysiloxane; a dialkylvinyl terminated dimethylmethylvinyl polysiloxane copolymer; a dialkylvinyl terminated methylphenylpolysiloxane, a dialkylalkenyl terminated methylvinylmethylphenylsiloxane; a dialkylalkenyl terminated methylvinyldiphenylsiloxane; a dialkylalkenyl terminated methylvinyl methylphenyl dimethylsiloxane; a trimethyl terminated methylvinyl methylphenylsiloxane; a trimethyl terminated methylvinyl diphenylsiloxane; or a trimethyl terminated methylvinyl methylphenyl dimethylsiloxane.

Hence, the adhesion mediator composition as described herein comprises
(i) A trialkoxysilane, of the formula $Si(OR)_3R^1$ wherein each R may be the same or different and is an alkyl group having at least two carbons per group and each $R^1$ may be the same or different and is an unsaturated group selected from an alkenyl group or an alkynyl group; which trialkoxysilane is present in an amount of from 20 to 40 wt. % of the composition, alternatively from 25 wt. % to 38 wt. % of the adhesion mediator composition, alternatively from 25 wt. % to 35 wt. % of the adhesion mediator composition;
(ii) A platinum group metal based hydrosilylation reaction catalyst in an amount of from 0.1-1.5 wt. % of the composition, alternatively from 0.1-1.0 wt. %, alternatively 0.1 to 0.5 wt. %, of the composition;
(iii) An alkoxy titanium compound having from 2 to 4 alkoxy groups, in an amount of from 1 to 10 wt. %, alternatively from 2 to 8 wt. %, alternatively from 2 to 7 wt. % of the composition;
(iv) A tetraalkoxysilane of the formula $Si(OR^2)_4$ wherein each $R^2$ may be the same or different and is having at least two carbons per group, which tetraalkoxysilane is present in an amount of from 5 to 20 wt. % of the composition alternatively from 5 to 15 wt. %, alternatively from 7 to 15 wt. %; and
(v) Either
(a') a polyorganosiloxane containing at least two unsaturated groups, selected from alkenyl groups and alkynyl groups, per molecule and having a viscosity in a range of 50 mPa·s to 9000 mPa·s alternatively a viscosity in a range of 100 mPa·s to 9000 mPa·s; alternatively a viscosity in a range of 100 mPa·s to 8000 mPa·s alternatively a viscosity in a range of 100 mPa·s to 7500 mPa·s; alternatively a viscosity in a range of 100 mPa·s to 7000 mPa·s alternatively a viscosity in a range of 200 mPa·s to 7000 mPa·s; alternatively a viscosity in a range of 300 mPa·s to 5000 mPa·s; in each case using a Brookfield™ viscometer with an RV-4 Spindle at 20 rpm at 25° C.; or
(b') a mixture of two or more polyorganosiloxanes containing at least two unsaturated groups, selected from alkenyl groups and alkynyl groups, per molecule, which mixture has viscosity in a range of 50 mPa·s to 9000 mPa·s alternatively a viscosity in a range of 100 mPa·s to 9000 mPa·s; alternatively a viscosity in a range of 100 mPa·s to 8000 mPa·s alternatively a viscosity in a range of 100 mPa·s to 7500 mPa·s; alternatively a viscosity in a range of 100 mPa·s to 7000 mPa·s alternatively a viscosity in a range of 200 mPa·s to 7000 mPa·s; alternatively a viscosity in a range of 300 mPa·s to 5000 mPa·s; in each case using a Brookfield™ viscometer with an RV-4 Spindle at 20 rpm at 25° C.
wherein said component (v) is present in an amount of from 25 to 60 wt. % of the composition, alternatively in an amount of from 30 to 60 wt. % of the composition, alternatively in an amount of from 35 to 55 wt. % of the composition.

Any suitable combination of components (i) to (v) may be utilised with or without additives but the total wt. % of the composition is 100 wt. % irrespective of whether or not additives are included.

In one embodiment of the disclosure herein, the adhesion mediator composition may comprise
(i) A trialkoxysilane, of the formula $Si(OR)_3R^1$ wherein each R may be the same or different and is an alkyl group having at least two carbons per group and each $R^1$ may be the same or different and is an unsaturated group selected from an alkenyl group or an alkynyl group; which trialkoxysilane is present in an amount of from 20 to 40 wt. % of the composition, alternatively from 25 wt. % to 38 wt. % of the adhesion mediator composition, alternatively from 25 wt. % to 35 wt. % of the adhesion mediator composition;
(ii) A platinum group metal based hydrosilylation reaction catalyst selected from one or more co-ordination compounds of platinum in an amount of from 0.1-1.5 wt. % of the composition, alternatively from 0.1-1.0 wt. %, alternatively 0.1 to 0.5 wt. %, of the composition;
(iii) An alkoxy titanium compound having from 2 to 4 alkoxy groups selected from $Ti(OR^3)_4$, $Ti(OR^3)_3R^4$, $Ti(OR^3)_2R^4_2$ where each $R^4$ is the same or different and is selected from an alkyl group, an alkenyl group or an alkynyl group and each $R^3$ is selected from an isobutyl group or n-butyl group or component (iii) is an ester of titanic acid and the enolate of acetoacetic ester; in an amount of from 1 to 10 wt. %, alternatively from 2 to 8 wt. %, alternatively from 2 to 7 wt. % of the composition;
(iv) A tetraalkoxysilane of the formula $Si(OR^2)_4$ wherein each R 2 may be the same or different and is an alkyl group in an amount of from 5 to 20 wt. % of the composition alternatively from 5 to 15 wt. %, alternatively from 7 to 15 wt. %; and
(v) Either
(a') a polyorganosiloxane containing at least two unsaturated groups, selected from alkenyl groups and alkynyl groups, per molecule and having a viscosity in a range of 50 mPa·s to 9000 mPa·s, alternatively a viscosity in a range of 100 mPa·s to 9000 mPa·s; alternatively a viscosity in a range of 100 mPa·s to 8000 mPa·s alternatively a viscosity in a range of 100 mPa·s to 7500 mPa·s; alternatively a viscosity in a range of 100 mPa·s to 7000 mPa·s alternatively a viscosity in a range of 200 mPa·s to 7000 mPa·s; alternatively a viscosity in a range of 300 mPa·s to 5000 mPa·s; in each case using a Brookfield™ viscometer with an RV-4 Spindle at 20 rpm at 25° C. using a Brookfield™ viscometer with an RV-4 Spindle at 20 rpm at 25° C.; or
(b') a mixture of two or more polyorganosiloxanes containing at least two unsaturated groups, selected from alkenyl groups and alkynyl groups, per molecule, which mixture has a viscosity in a range of having a viscosity in a range of 50 mPa·s to 9000 mPa·s alternatively a viscosity in a range of 100 mPa·s to 9000 mPa·s; alternatively a viscosity in a range of 100 mPa·s to 8000 mPa·s alternatively a viscosity in a range of 100 mPa·s to 7500 mPa·s; alternatively a viscosity in a range of 100 mPa·s to 7000 mPa·s alternatively a viscosity in a range of 200 mPa·s to 7000 mPa·s; alternatively a viscosity in a range of 300 mPa·s to 5000 mPa·s; in each case using a Brookfield™ viscometer with an RV-4 Spindle at 20 rpm at 25° C. using a Brookfield™ viscometer with an RV-4 Spindle at 20 rpm at 25° C.;
wherein said component (v) is present in an amount of from 25 to 60 wt. % of the composition, alternatively in an amount of from 30 to 60 wt. % of the composition, alternatively in an amount of from 35 to 55 wt. % of the composition.

Any suitable combination of components (i) to (v) may be utilised with or without additives but the total wt. % of the composition is 100 wt. % irrespective of whether or not additives are included.

The adhesion mediator composition may be homogeneously mixed using any suitable mixing means, indeed for laboratory purposes the composition was hand mixed in an appropriately sized container using a spoon or spatula or the like.

As described above there is also provided herein a method for the preparation of a composite of silicone elastomer and a thermoplastic such as a polyolefin, comprising the steps of
(a) optionally activating a thermoplastic substrate surface;

(b) treating the optionally activated thermoplastic substrate surface with an adhesion mediator composition as hereinbefore described;

(c) applying a hydrosilylation curable silicone rubber composition on to the treated surface resulting from step (b);

(d) curing said hydrosilylation curable silicone rubber composition.

Any suitable thermoplastic substrate may be utilised. In one embodiment the thermoplastic substrate is selected from a polyolefin such as polypropylene, high-density polyethylene (HDPE) or low-density polyethylene (LDPE); polycarbonates (PC), polyurethane, styrene resin, polyethylene, polypropylene, polyacrylates, polymethacrylates, polyesters, polyethylene terephthalate, polyamides e.g., nylon and polybutylene terephthalate (PBT) as well as suitable copolymers thereof. In one embodiment the thermoplastic is a polyolefin.

Any suitable means of activating the surface of the thermoplastic substrate may be utilised, when desired. These include, for the sake of example, by plasma treatment, corona discharge treatment, UV-C/ozone or Vacuum-UV irradiation, flame-pyrolytic deposition of amorphous silicon dioxide, or flame treatment.

The term "plasma" covers a huge range of systems whose density and temperature vary by many orders of magnitude. Some plasmas are very hot and all their microscopic species (ions, electrons, etc.) are in approximate thermal equilibrium, the energy input into the system being widely distributed through atomic/molecular level collisions. Other plasmas, however, particular those utilised at room temperature and pressure or under vacuum, where collisions are relatively infrequent, have their constituent species at widely different temperatures and are called "non-thermal equilibrium" plasmas where free electrons are very hot with temperatures of many thousands of degrees Kelvin whilst the neutral and ionic species remain cool. Because the free electrons have almost negligible mass, the total system heat content is low and the plasma e.g., atmospheric pressure plasma discharges such as atmospheric pressure dielectric barrier discharge and atmospheric pressure glow discharge operates close to room temperature thus allowing the processing of temperature sensitive materials, such as plastics or polymers, without imposing a damaging thermal burden onto the sample. However, the hot electrons create, through high energy collisions, a rich source of radicals and excited species with a high chemical potential energy capable of profound chemical and physical reactivity and therefore are suitable for many technological applications such as in this case surface activation.

A corona discharge is an electrical discharge caused by the ionization of a fluid such as air surrounding a conductor carrying a high voltage. It represents a local region where the air (or other fluid) has undergone electrical breakdown and become conductive, allowing charge to continuously leak off the conductor into the air and may be useful for activation purposes.

UV-C radiation is particularly advantageously provided at a wavelength of 100 nm to 280 nm, preferably of 150 nm to 260 nm, and particularly preferably of 170 nm to 260 nm and may be used to activate the surface of suitable thermoplastic substrates such as polyolefin substrates to activate the thermoplastic surface and improve the adhesion of silicone on the surface thereof after application of a coating of the adhesion mediator composition as hereinbefore described.

Flame-pyrolytic deposition of amorphous silicon dioxide may be undertaken by any suitable process, such as "the PYROSIL™ Process" of Sura Instruments GmbH of Jena Germany in wherein the substrate is fed through a gas flame which is doped with a silicon-containing precursor material (PYROSIL™) which precursor burns in the flame and deposits on the surface in a very thin but dense and firmly adhering silicon oxide coating (5-100 nm).

In the case of each radiation/activation process used, said radiation/activation is preferably produced by means of a radiation source, with the radiation source being moved over the surface of the thermoplastic during the irradiation. Alternatively, the radiation/activation source may be stationary manner and/or e.g., the substrate may be moved relative thereto.

The irradiation of the surface of the thermoplastic by means of UV-C radiation is further advantageously carried out while forming ozone, with the ozone interacting with the surface during the irradiation. It has been found on the irradiation of thermoplastic materials with UV-C radiation that ozone is formed by the interaction with the air atmosphere, with the ozone in turn producing a substantial improvement in the activation of the surface in interaction with the surface of the thermoplastic. The ozone formed is consequently additionally used to produce the improvement of the adhesion of silicone on the surface of the thermoplastic.

If the irradiation is carried out within a closed space, in particular within an irradiation chamber darkened to the outside, the advantage is in particular achieved in conjunction with the ozone that the ozone remains in the region of the thermoplastic close to the surface and can enter into corresponding interaction with the surface. Provision can additionally be made for the amplification of this effect to correspondingly optimize the irradiation chamber to ensure an interaction of the ozone with the surface that is as intense as possible. The irradiation chamber is, for example, selected as so small in size that a concentration of the ozone above the surface of the thermoplastic is present that is as high as possible.

The duration of the irradiation may be, for example, from 0.1 seconds up to fifteen minutes; alternatively, from 0.1 seconds up to ten minutes; alternatively, from three seconds up to seven minutes; alternatively, from three seconds up to five minutes; alternatively, from 0.1 seconds up to one minute; alternatively, from 0.4 seconds to 30 seconds.

For the present activation step UV-C or particularly corona discharge are the preferred methods of activation in step (a) of the process described herein.

Upon completion of step (a) activation, when required, a layer of an adhesion mediator composition as hereinbefore described is applied onto the substrate surface in accordance with step (b). Any suitable method may be used, such as those described above, i.e., by spraying, brushing, rolling, flooding and squeegeeing, application with a knife coater or by wiping or transfer printing with a sponge or stamping or the like or the substrate may in certain circumstances be dip-coated by immersion in a bath of the adhesion mediator composition, dependent on the size and shape of the substrate. In the lab it was found that merely wiping the surface of the thermoplastic once the adhesion mediator composition had been applied by pipette or the like was perfectly adequate. The adhesion mediator composition coating subsequent to application on the substrate, is typically in the region of 0.001 to 3 mm thick, alternatively 0.001 to 2 mm thick, alternatively 0.001 to 1 mm thick.

In step (c), a hydrosilylation curable silicone rubber composition is applied onto the substrate treated with the adhesion mediator composition in step (b). This may be undertaken as soon as the adhesion mediator composition has been applied on to the activated substrate. By undertaking this step straight away, the adhesion mediator composition is able to soak into the hydrosilylation curable silicone rubber composition surface at the thermoplastic/hydrosilylation curable silicone rubber composition interface such that the adhesion mediator composition and hydrosilylation curable silicone rubber composition effectively "cure" together at the surface of the thermoplastic during step (d).

Any suitable hydrosilylation curable silicone rubber compositions may be applied onto the substrate coated with the adhesion mediator composition. A standard hydrosilylation curable silicone rubber (or LSR) composition used for application onto the adhesion mediator composition treated substrate may comprise:
  (I) One or more polyorganosiloxane polymers, e.g., one or more polydiorganosiloxane polymers having the chemical structure as described in component (v) of the adhesion mediator composition described above having a viscosity of from 1000 to 100,000 mPa·s at 25° C.;
  (II) Optionally one or more finely divided, reinforcing fillers, alternatively one or more finely divided, reinforcing fillers in an amount of from 5 to 40 wt. % of the composition;
  (III) an organohydrogenpolysiloxane having at least two, alternatively at least three Si—H groups per molecule;
  (IV) a platinum group metal based hydrosilylation reaction catalyst such as described in component (ii) of the adhesion mediator composition described above; and optionally
  (V) a cure inhibitor.

Component (I) is one or more polyorganosiloxane polymers, e.g., one or more polydiorganosiloxane polymers having the chemical structure as described in component (v) of the adhesion mediator composition described above but which may have a viscosity of from 1000 to 100,000 mPa·s at 25° C. In the case of component (I) the polymer is present in the composition in an amount of from 35 to 85 wt. % of the composition.

Component (II) is one or more finely divided, reinforcing fillers.

The reinforcing fillers of component (II) may be exemplified by finely divided fumed silica and/or a finely divided precipitated silica and/or suitable silicone resins.

Precipitated silica fumed silica and/or colloidal silicas are particularly preferred because of their relatively high surface area, which is typically at least 50 m²/g (BET method in accordance with ISO 9277: 2010). Fillers having surface areas of from 50 to 450 m²/g (BET method in accordance with ISO 9277: 2010), alternatively of from 50 to 300 m²/g (BET method in accordance with ISO 9277: 2010), are typically used. All these types of silica are commercially available.

When reinforcing filler (II) is naturally hydrophilic (e.g., untreated silica fillers), it is typically treated with a treating agent to render it hydrophobic. These surface modified reinforcing fillers (II) do not clump and can be homogeneously incorporated into polydiorganosiloxane polymer (v), described below, as the surface treatment makes the fillers easily wetted by polydiorganosiloxane polymer (v).

Typically reinforcing filler (II) may be surface treated with any low molecular weight organosilicon compounds disclosed in the art applicable to prevent creping of LSR compositions during processing. For example, organosilanes, polydiorganosiloxanes, or organosilazanes e.g., hexaalkyl disilazane, short chain siloxane diols to render the filler(s) hydrophobic and therefore easier to handle and obtain a homogeneous mixture with the other ingredients. Specific examples include, but are not restricted to, silanol terminated trifluoropropylmethylsiloxane, silanol terminated vinyl methyl (ViMe) siloxane, silanol terminated methyl phenyl (MePh) siloxane, liquid hydroxyldimethyl-terminated polydiorganosiloxane containing an average from 2 to 20 repeating units of diorganosiloxane in each molecule, hydroxyldimethyl terminated Phenylmethyl Siloxane, hexaorganodisiloxanes, such as hexamethyldisiloxane, divinyltetramethyldisiloxane; hexaorganodisilazanes, such as hexamethyldisilazane (HMDZ), divinyltetramethyldisilazane and tetramethyldi(trifluoropropyl)disilazane; hydroxyldimethyl terminated polydimethylmethylvinyl siloxane, octamethyl cyclotetrasiloxane, and silanes including but not limited to methyltrimethoxysilane, dimethyldimethoxysilane, vinyltrimethoxysilane, methyltriethoxysilane, vinyltriethoxysilane, chlrotrimethyl silane, dichlrodimethyl silane, trichloromethyl silane.

In one embodiment, the treating agent may be selected from silanol terminated vinyl methyl (ViMe) siloxane, liquid hydroxyldimethyl-terminated polydiorganosiloxane containing an average from 2 to 20 repeating units of diorganosiloxane in each molecule, hexaorganodisiloxanes, such as hexamethyldisiloxane, divinyltetramethyldisiloxane; hexaorganodisilazanes, such as hexamethyldisilazane (HMDZ), divinyltetramethyldisilazane and; hydroxyldimethyl terminated polydimethylmethylvinyl siloxane, octamethyl cyclotetrasiloxane, and silanes including but not limited to methyltriethoxysilane, dimethyldiethoxysilane and/or vinyltriethoxysilane. A small amount of water can be added together with the silica treating agent(s) as processing aid.

The surface treatment of untreated reinforcing filler (II) may be undertaken prior to introduction in the composition or in situ (i.e., in the presence of at least a portion of the other ingredients of the composition herein by blending these ingredients together at room temperature or above until the filler is completely treated. Typically, untreated reinforcing filler (II) is treated in situ with a treating agent in the presence of polydiorganosiloxane polymer (I) which results in the preparation of a silicone rubber base material which can subsequently be mixed with other ingredients.

Reinforcing filler (II) is optionally present in an amount of up to 40 wt. % of the composition, alternatively from 1.0 to 40 wt. % of the composition, alternatively of from 5.0 to 35 wt. % of the composition, alternatively of from 10.0 to 35 wt. % of the composition.

Component (III) is a cross-linker in the form of a polyorganosiloxane containing at least two or three silicon-bonded hydrogen atoms per molecule. Component (III) normally contains three or more silicon-bonded hydrogen atoms so that the hydrogen atoms can react with the unsaturated alkenyl or alkynyl groups of polymer (I) to form a network structure therewith and thereby cure the composition. Some or all of Component (III) may alternatively have two silicon bonded hydrogen atoms per molecule when polymer (I) has greater than two unsubstituted groups per molecule.

The molecular configuration of the polyorganosiloxane containing at least two or three silicon-bonded hydrogen atoms per molecule (III) is not specifically restricted, and it can be a straight chain, a straight chain with some branching, cyclic or silicone resin based.

While the molecular weight of component (III) is not specifically restricted, the viscosity is typically from 15 to 50,000 mPa·s at 25° C. relying on either a Brookfield™ rotational viscometer with spindle LV-4 (designed for viscosities in the range between 1,000-2,000,000 mPa·s) or a Brookfield™ rotational viscometer with spindle LV-1 (designed for viscosities in the range between 15-20,000 mPa·s) for viscosities less than 1000 mPa·s and adapting the speed according to the polymer viscosity, in order to obtain a good miscibility with polymer (I).

Silicon-bonded organic groups used in component (III) may be exemplified by alkyl groups such as methyl, ethyl, propyl, n-butyl, t-butyl, pentyl, hexyl; phenyl, tolyl, xylyl, or similar aryl groups; 3-chloropropyl, 3,3,3-trifluoropropyl, or similar halogenated alkyl group, preferable of which are methyl and phenyl groups. Preferably the silicon-bonded organic groups used in component (III) are alkyl groups, alternatively methyl, ethyl or propyl groups.

Examples of the polyorganosiloxane containing at least two or three silicon-bonded hydrogen atoms per molecule (III) include but are not limited to:
- (a″) trimethylsiloxy-terminated methylhydrogenpolysiloxane,
- (b″) trimethylsiloxy-terminated polydimethylsiloxane-methylhydrogensiloxane,
- (c″) dimethylhydrogensiloxy-terminated dimethylsiloxane-methylhydrogensiloxane copolymers,
- (d″) dimethylsiloxane-methylhydrogensiloxane cyclic copolymers,
- (e″) copolymers and/or silicon resins consisting of $(CH_3)_2HSiO_{1/2}$ units, $(CH_3)_3SiO_{1/2}$ units and $SiO_{4/2}$ units,
- (f′) copolymers and/or silicone resins consisting of $(CH_3)_2HSiO_{1/2}$ units and $SiO_{4/2}$ units,
- (g″) Methylhydrogensiloxane cyclic homopolymers having between 3 and 10 silicon atoms per molecule;
- alternatively, component B, the cross-linker, may be a filler, e.g., silica treated with one of the above, and mixtures thereof.

Component (III) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsiloxy groups; a cyclic methylhydrogenpolysiloxane; a copolymer consisting of $(CH_3)_2HSiO_{1/2}$ siloxane units and $SiO_{4/2}$ units; a copolymer consisting of $(CH_3)_2HSiO_{1/2}$ siloxane units, $(CH_3)_3SiO_{1/2}$ siloxane units, and $SiO_{4/2}$ units, the aforementioned polyorganosiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned polyorganosiloxanes. In one embodiment the Component (III) is selected from a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups.

The polyorganosiloxane cross-linker (III) is generally present in the curable silicone elastomer composition such that the molar ratio of the total number of the silicon-bonded hydrogen atoms in component (III) to the total number of alkenyl and/or alkynyl groups in polymer (v) is from 0.5:1 to 20:1. When this ratio is less than 0.5:1, a well-cured composition will not be obtained. When the ratio exceeds 20:1, there is a tendency for the hardness of the cured composition to increase when heated. Preferably in an amount such that the ratio of the mole number of silicon-bonded hydrogen atoms of component (III) to the mole number of alkenyl groups of component (I) ranges from 0.7:1.0 to 5.0:1.0, preferably from 0.9:1.0 to 2.5:1.0, and most preferably from 0.9:1.0 to 2.0:1.0.

The silicon-bonded hydrogen (Si—H) content of component (III) is determined using quantitative infra-red analysis in accordance with ASTM E168. In the present instance the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

Typically dependent on the number of unsaturated groups in component (I) and the number of Si—H groups in component (III), component (III) will be present in an amount of from 0.1 to 25% by weight of the LSR composition, alternatively from 0.1 to 20%, by weight of the LSR composition alternatively 0.1 to 15% by weight of the LSR composition, further alternatively from 0.5% to 10% by weight of the LSR composition.

Component (IV) is a platinum group metal based hydrosilylation reaction catalyst such as described in component (ii) of the adhesion mediator composition described above. It is typically present in a quantity of platinum atom that provides from 0.1 to 500 ppm (parts per million) with respect to the weight of the reactive ingredients, components (I) and (III). The catalyst may be added as a single species or as a mixture of two or more different species. Typically, dependent on the form/concentration in which the catalyst is provided the amount of catalyst present will be within the range of from 0.05-1.5 wt. % of the composition, alternatively from 0.05-1.0 wt. %, alternatively from 0.1-1.0 wt. %, alternatively 0.1 to 0.5 wt. %, of the composition, wherein the platinum catalyst is provided in a masterbatch of polymer such as (I) and (v) described above.

In one embodiment the hydrosilylation catalysts are co-ordination compounds of platinum. and the final composite contains a maximum of 50 mg of platinum per kg, typically the cumulative total of platinum present in the adhesion mediator described above and the silicone rubber material being applied onto the thermoplastic substrate. content of the adhesion mediator herein.

Component (V) of the LSR composition is one or more optional cure inhibitors. Cure inhibitors are used, when required, to prevent or delay the addition-reaction curing process especially during storage. The optional Addition-reaction inhibitors of platinum-based catalysts are well known in the art and include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

One class of known hydrosilylation reaction inhibitors are the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof. Derivatives of acetylenic alcohol may include those compounds having at least one silicon atom.

When present, inhibitor concentrations as low as 1 mole of inhibitor per mole of the metal of catalyst will in some instances impart satisfactory storage stability and cure rate. In other instances, inhibitor concentrations of up to 500 moles of inhibitor per mole of the metal of catalyst are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition.

In one embodiment the inhibitor when present is selected from 1-ethynyl-1-cyclohexanol (ETCH) and/or 2-methyl-3-butyn-2-ol and is present in an amount of greater than zero to 0.1% by weight of the composition.

Such compositions may also comprise one or more optional additives depending on the intended use. Examples include mold releasing agents, non-reinforcing fillers, adhesion catalysts, peroxides, pigments, electrically conductive fillers, thermally conductive fillers, pot life extenders, flame retardants, lubricants, mold release agents, UV light stabilizers, bactericides, wetting agents, heat stabilizers, compression set additives and plasticizers or the like. In one embodiment the composition contains no optional additives other than component (V) above.

The hydrosilylation curable silicone rubber compositions described above are usually stored before use in two or more parts. In the case of a two-part composition, the two parts are usually referred to as part (A) and part (B):

Part (A) typically contains the catalyst (IV) in addition to polyorganosiloxane (I) and filler (II) when present, and Part (B) usually includes component (III), and when present component (V) inhibitor as well as remaining polyorganosiloxane (I) and/or the filler (II).

It is important for the catalyst (IV) to be stored separately from cross-linker (III) to prevent premature cure during storage.

Any optional additives may be in either part (A) or part (B) or in both parts providing they do not negatively affect the storage of any of the essential ingredients present in the respective part.

A wide variety of hydrosilylation curable silicone compositions are commercially available on the market. These include, for the sake of example, Silastic™ RBL-9200-20 (-70) LSR; Xiameter™ RBL 2004-20(-75) LSR; Silastic™ NPC 9300-40/-50/-70 LSR; Silastic™ LTC 9400-40/-50 LSR and Silastic™ 3D 3335 LSR all available from Dow Silicones Corporation of Midland, Michigan. Other hydrosilylation curable silicone compositions which may be utilised with the adhesion mediator as hereinbefore described include moldable silicones such as those described in U.S. Pat. Nos. 8,691,910 B2, 8,853,332 B2 and 8,859,693 B2. The homogeneous mixing of the components of hydrosilylation curable silicone rubber compositions used herein may be undertaken using a suitable mixing means such as a kneader mixer, a static mixer in a liquid injection molding machine, a Z-blade mixer, a two roll mill (open mill), a three roll mill, a Haake™ Rheomix OS Lab mixer, a screw extruder or a twin-screw extruder or the like. Speed mixers as sold by e.g., Hauschild and as DC 150.1 FV, DAC 400 FVZ or DAC 600 FVZ, may alternatively be used.

Finally, in step (d) the hydrosilylation curable silicone rubber composition is cured at a temperature below the melt temperature of the thermoplastic substrate e.g., preferably below 150° C., alternatively below 130° C., alternatively below 120° C. These are chosen because thermoplastics such as polyolefins "melt" above certain temperatures to an extent they become pliable or moldable at such elevated temperatures and subsequently solidify again upon cooling. Given hydrosilylation curable silicone rubber compositions are cured at elevated temperatures it is highly preferred that hydrosilylation curable silicone rubber compositions used herein to be adhered to thermoplastic substrates such as polyolefin substrates have the ability to cure at a temperature between room temperature and the melt temperature of the thermoplastic substrate.

Curing of the hydrosilylation curable silicone rubber composition on the substrate can, for example, take place in a mold to form a molded composite part/with the silicone elastomer resulting from the cure process adhered to an e.g., polyolefin substrate. In the case of this polyolefin substrate, the hydrosilylation curable silicone rubber compositions used herein may for example be injection molded to form an article adhered to the polyolefin material subsequent to the polyolefin material being coated with adhesion mediator composition, or the composition can be overmolded by injection moulding around such polyolefin substrates or articles or over a polyolefin substrate subsequent to the polyolefin material being coated with adhesion mediator composition.

The hydrosilylation curable silicone rubber compositions used herein may therefore be applied and cured on to the treated substrate by any suitable process e.g., by injection moulding, using e.g., 2K type injection molding, press moulding, extrusion moulding, transfer moulding, press vulcanization, or calendaring. In one embodiment the composite is prepared by injection moulding, using a 2K type injection molding unit.

When cured in the presence of a heat sensitive substrate, the hydrosilylation curable silicone rubber compositions as hereinbefore described may be cured under such conditions enabling development of mechanical adhesion with the heat sensitive substrate and the like, and more specifically, by using a temperature and curing time at which the heat sensitive substrate is not deformed, melted, or denatured.

The hydrosilylation curable silicone rubber compositions as hereinbefore described may be applied to the surface of a thermoplastic substrate such as a polyolefin substrate subsequent to the thermoplastic material being coated with adhesion mediator composition by any suitable means such as rolling, spreading, 3-D printing and the like, and cured as described above.

In the case of using a 3-D printing method, a typical method of forming a three-dimensional (3-D) article may comprise multiple steps. For example, after the adhesion mediator composition has been applied onto a thermoplastic e.g., polyolefin substrate surface, the method may comprise (i) printing a first hydrosilylation curable silicone rubber composition with a 3-D printer to form a layer on top of the treated substrate. The method may further comprise (ii) heating the layer to form an at least partially cured layer. In addition, the method may comprise (iii) printing a second heat-curable silicone composition on the at least partially cured layer with the 3-D printer to form a subsequent layer. The method may also comprise (iv) heating the subsequent layer to form an at least partially cured subsequent layer. Optionally, steps iii) and iv) may be repeated with independently selected hydrosilylation curable silicone rubber composition(s) for any additional layer(s) to form the 3-D composite article. If desired the thermoplastic substrate may be activated or partially activated (e.g., due to masking part of the substrate surface resulting in only the unmasked region being activated) prior to step (i).

In one embodiment of the process hereinbefore defined step (c) of the process may be undertaken by 3-D printing a hydrosilylation curable silicone rubber composition onto the thermoplastic e.g., polyolefin substrate previously treated with an adhesion mediator composition as described herein. In such a case, steps (c) and (d) may be as follows:

printing a first hydrosilylation curable silicone rubber composition as hereinbefore described with a 3-D printer to form a layer on the optionally activated thermoplastic, e.g., polyolefin substrate treated with adhesion mediator composition resulting from steps (a) and (b);
i. heating the layer to form an at least partially cured layer;
ii. printing a second hydrosilylation curable silicone rubber composition on the at least partially cured layer with the 3-D printer to form a subsequent layer;
iii. heating the subsequent layer to form an at least partially cured subsequent layer; and,
iv. optionally, repeating steps iii) and iv) with independently selected heat-curable silicone composition(s) for any additional layer(s) to form the 3-D article.

There is also provided, an article or a composite part of an article obtained or obtainable from the above method.

In one embodiment herein there is provided an article composite part consisting of a silicone elastomer cured from a hydrosilylation curable silicone rubber composition as hereinbefore described or consisting of a silicone elastomer cured from hydrosilylation curable silicone rubber composition on a rigid or flexible thermoplastic, e.g., polyolefin substrate such as the type described above, providing the rigid or flexible substrate was coated with a layer of adhesion mediator composition prior to the application of the hydrosilylation curable silicone rubber composition. In one embodiment the substrate is a polyolefin.

In another embodiment the hydrosilylation curable silicone rubber composition as hereinbefore described may be applied to the surface of the substrate be processed using a 3-D printing method providing the substrate was coated with a layer of adhesion mediator composition prior to the application of the hydrosilylation curable silicone rubber composition.

Examples of such articles or composite parts, in the case of all of the above can be found in various industries including, but not limited to, automotive applications, industrial applications, electronic applications and consumer applications such as packaging, storage, treatment, production, preparation, processing, consumption and molding of food and drink products for human consumption provided they meet the necessary regulations such as for household products, food contact, dish washer compatibility or beverage/fluid compliance (e.g., hot water, coffee, tea contact in machines). In automotive applications, this may include housings with a silicone seal or gasket, plugs and connectors, components of various sensors, membranes, diaphragms, climate venting components, and the like. Electronic applications may include mobile phone cover seals, mobile phone accessories, precision electronic equipment, electrical switches and switch covers, watches and wristbands, wearable apparatus, e.g., facemasks, wearable electronic devices, and the like.

A composite part may also be selected from parts of mobile phones, mobile telecommunications equipment, gaming machines, clocks, image receivers, DVD equipment, MD equipment, CD equipment, and other precision electronic equipment, TVs, thin displays of liquid crystal TVs and plasma TVs, various home appliance, copying machines, printers, facsimile machines, and other office equipment, connector seals, spark plug caps, components of various sensors, and other automobile components.

Composite articles and/or parts comprising or consisting of silicone rubber and thermoplastics such as polyolefins used in the transport, packaging, storage, treatment, production, preparation, processing, consumption and molding of household products and/or food and drink products for human consumption may include parts of machines for production, preparation, shaping and processing of food products, baking utensils, such as baking molds, kitchen equipment and/or food and drink processing equipment such as drink makers, kettles, cutlery, crockery, cookery ware, drinking vessels, including feeding bottles for infants, other types of containers, trays, food molds, as well as parts in ovens, including microwave ovens, refrigerators, breadmakers, rice cookers, and/or dish washers and containers used for transport and materials that contact water intended for human consumption and the like.

EXAMPLES

In the following examples, unless otherwise indicated all viscosities were measured at 25° C. using or a Brookfield™ rotational viscometer with spindle RV-4 for viscosities less than 10,000 mPa·s, in each case at a speed of 20 rpm.

Unless otherwise indicated a polypropylene substrate was used in each Example. Rocholl commercial test plates made out of SIMONA™ DWST PP from Simona AG of Kim Germany. The substrates used in the examples had the dimensions: 25 mm×100 mm (3 mm thickness) and were cleaned with isopropanol. Typically, the isopropanol evaporated immediately but the substrates were left for about 10 minutes at room temperature to dry prior to activation.

Each activated substrate was coated with a layer of adhesion mediator composition as hereinbefore described or a comparative coating composition as indicated in the respective Tables using a pipette to apply the adhesion mediator composition or a comparative coating composition as indicated in the respective Tables and then wiping the composition over the surface of the substrate to provide a continuous layer of said composition over the substrate. The coated substrates were then overmolded with a 3 mm layer of LSR and cured by compression molding at 300 bar (30 MPa) at 120° C. for 5 minutes. The thickness of the layer was dictated by the mold height which was 3 mm.

The resulting specimen were stored for at least 24 hours before performing the tests. The peel strength testing was carried out using floating roller peel test in accordance with ASTM D3167-10(2017) at test speed of 300 mm per minute and the average force (peel strength) during the peel experiment was recorded (in N/mm).

Example 1

In example 1 several adhesion mediator compositions and a comparative were prepared in accordance with the compositions in Table 1a. and the method of activation and duration of activation as well as subsequent peel strength results are shown in Table 1b.

TABLE 1a

Adhesion mediator composition (wt. %)

|  | Ex. 1-1 | Ex. 1-2 | Ex. 1-3 | Ex. 1-4 | Ex. 1-5 | C. 1-1 |
|---|---|---|---|---|---|---|
| Vinyltriethoxysilane | 32.18 | 32.18 | 32.18 | 32.18 | 32.18 | 32.18 |
| Karstedt's catalyst | 0.65 | 0.65 | 0.65 | 0.65 | 0.65 | 0.65 |
| Tetra-tertiarybutyltitanate | 5.33 | 5.33 | 5.33 | 5.33 | 5.33 | 5.33 |
| Tetraethoxysilane | 11.17 | 11.17 | 11.17 | 11.17 | 11.17 | 11.17 |
| Polymer 1 | 50.67 | 50.67 | 50.67 | 50.67 | 50.67 | 50.67 |

Polymer 1 was a vinyldimethyl terminated polydimethylsiloxane having a viscosity of approximately viscosity of 450 mPa·s at 25° C. and a vinyl content of 0.46 wt. % Vi content. The Karstedt's catalyst is provided in a polymer 1 masterbatch.

Three alternative activation methods were used, UV-C, corona discharge and flame-pyrolytic deposition of amorphous silicon dioxide.

The UV-C treatments were performed using a UV-C treatment chamber (ELG100S) from Dinies Technologies GmbH. The chamber employed two 11 Watt UV-lamps (U11W-215ozon) from Dinies Technologies GmbH.

The corona discharge treatments were performed using a plasma generator (Generator FG 1001) from Agrodyn Hochspannungstechnik GmbH. The generator had a rotating head which generated a corona discharge torch. The polymer plates were cleaned using isopropanol and moved through the corona plasma using a mount with a stepper motor. By varying the speed of the stepper motor, different exposure times were realized.

Flame-pyrolytic deposition of amorphous silicon dioxide was carried out using "the PYROSIL™ Process" of Sura Instruments GmbH of Jena Germany (https://www.sura-instruments.de/en/technologies/pyrosilr-process) wherein the substrate is fed through a gas flame which is doped with a silicon-containing precursor material (PYROSIL™) which precursor burns in the flame and deposits on the surface in a very thin but dense and firmly adhering silicon oxide coating (5-100 nm).

The method of activation for each SIMONA™ DWST PP substrate used in Ex. 1-1 to Ex. 1-5 and C. 1-1 is indicated in Table 1b. Subsequent to activation the respective compositions defined in Table 1a were each applied on to the respective activated substrate as previously described. Once the respective substrates had been activated and the adhesive mediator composition had been coated thereover, a layer of a liquid silicone rubber composition (LSR 1), Silastic™ 3D 3335 LSR from Dow Silicones Corporation was applied (overmolded) as described above and cured to generate a composite material.

The resulting composites were stored for about 24 hours before performing the peel adhesion testing using a floating roller peel test in accordance with ASTM D3167. at test speed of 300 mm per minute and the average force during the peel experiment was recorded (in N/mm).

TABLE 1b

Adhesion mediator composition method of activation & peel strength using a polypropylene substrate

|  | Ex. 1-1 | Ex. 1-2 | Ex. 1-3 | Ex. 1-4 | Ex. 1-5 | C. 1-1 |
|---|---|---|---|---|---|---|
| UV-C [s] | 60 | 180 | 0 | 0 | 0 | 0 |
| Corona discharge [s] | 0 | 0 | 0.5 | 4.0 | 0 | 0 |
| PYROSIL ® Process [s] | 0 | 0 | 0 | 0 | 60 | 0 |
| Peel strength [N/mm] | 2.0 | 3.9 | 7.4 | 6.0 | 3.6 | <0.1 |

It can be seen that C. 1-1 demonstrates that unactivated polypropylene fails to provide sufficient peel strength to conduct the test, whilst all the activated substrates i.e., in Ex 1-1 to Ex 1-5 lead to adhesion. The results from Ex 1-3 and Ex 1-4 suggest that superior performance is achieved using corona discharge activation as compared to UV-C/Ozone irradiation and the PYROSIL™ Process.

Example 2

In example 2 several examples of adhesion mediator compositions were prepared. The compositions for Ex. 2-1 to 2-4 are shown in Table 2a, the compositions for Ex. 2-5 to 2-9 are shown in Table 2b, and they were compared with four comparatives, the compositions of which are depicted in Table 2c.

TABLE 2a

Adhesion mediator composition (wt. %) for Ex. 2-1 to 2-4

|  | Ex. 2-1 | Ex. 2-2 | Ex. 2-3 | Ex. 2-4 |
|---|---|---|---|---|
| Vinyltriethoxysilane | 32.18 | 0 | 0 | 32.27 |
| Allyltriethoxysilane | 0 | 32.18 | 0 | 0 |
| Hexenyltriethoxysilane | 0 | 0 | 31.70 | 0 |
| Karstedt's catalyst | 0.65 | 0.65 | 0.65 | 0.65 |
| Tetra-tert-butyltitanate | 5.33 | 5.33 | 5.37 | 5.35 |
| Tetraethoxysilane | 11.17 | 11.17 | 11.25 | 0 |
| Tetrapropoxysilane | 0 | 0 | 0 | 10.91 |
| Polymer 1 | 50.67 | 50.67 | 51.04 | 50.82 |

TABLE 2b

Adhesion mediator composition (wt. %) for Ex. 2-5 to 2-9

|  | Ex. 2-5 | Ex. 2-6 | Ex. 2-7 | Ex. 2-8 | Ex. 2-9 |
|---|---|---|---|---|---|
| Vinyltriethoxysilane | 32.18 | 32.18 | 32.18 | 32.18 | 32.01 |
| Karstedt's catalyst | 0.32 | 0.16 | 0.32 | 0.32 | 0.65 |
| Tetra-tert-butyltitanate | 5.33 | 5.33 | 5.33 | 5.33 | 0 |
| Tetra-n-butyltitanate | 0 | 0 | 0 | 0 | 5.85 |
| Tetraethoxysilane | 11.17 | 11.17 | 11.17 | 11.17 | 11.11 |
| Polymer 1 | 51.00 | 51.16 | 0 | 0 | 50.39 |
| Polymer 2 | 0 | 0 | 51.00 | 0 | 0 |
| Polymer 3 | 0 | 0 | 0 | 51.00 | 0 |

In Table 2b., in Ex. 2-7 and 2-8:
Polymer 2 was a 1:1 ratio (by weight) mixture of two vinyldimethyl terminated polydimethylsiloxane having a viscosity of approximately of 450 and 2000 mPa·s at 25° C., respectively and the average vinyl content of the mixture was 0.34 wt. % vinyl (Vi). The viscosity of the mixture was 1190 mPa·s;
Polymer 3 was a 1:1 mixture of two vinyldimethyl terminated polydimethylsiloxane having a viscosity of approximately of 450 and 9000 mPa·s at 25° C., respectively and the average vinyl content of the mixture was 0.28 wt. % Vi. The viscosity of the mixture was 2440 mPa·s; and when polymer 2 replaced polymer 1, the Karstedt's catalyst was provided in a polymer 2 masterbatch and likewise when polymer 3 replaced polymer 1, the Karstedt's catalyst was provided in a polymer 3 masterbatch.

TABLE 2c

Adhesion mediator composition comparatives (wt. %)

|  | C. 2-1 | C. 2-2 | C. 2-3 | C. 2-4 |
|---|---|---|---|---|
| Vinyltriethoxysilane | 0 | 32.18 | 21.27 | 32.18 |
| Vinyltrimethoxysilane | 34.11 | 0 | 0 | 0 |
| Karstedt's catalyst | 0.63 | 0.08 | 0.86 | 0.32 |
| Tetra-tert-butyltitanate | 5.18 | 5.33 | 3.52 | 5.33 |
| Tetraethoxysilane | 10.85 | 11.17 | 7.38 | 11.17 |
| Polymer 1 | 49.23 | 51.24 | 66.97 | 0 |
| Polymer 4 | 0 | 0 | 0 | 51.00 |

In Table 2c., Polymer 4 was a 1:1 mixture of two vinyldimethyl terminated polydimethylsiloxanes having a viscosity of approximately of 450 and about 55,000 mPa·s at 25° C., the latter viscosity was determined using a Brookfield™ rotational viscometer with spindle LV-4 (designed for viscosities in the range between 10,000-2,000,000 mPa·s) and a speed of 6 rpm) respectively with the average vinyl content of the mixture being 0.27 wt. % Vi. The viscosity of the mixture was 9250 mPa·s; and when polymer 4 replaced polymer 1, the Karstedt's catalyst was provided in a polymer 4 masterbatch.

Composite materials using the same substrate and LSR 1 as in Example 1 were prepared as described above utilising the alternative and comparative adhesion mediator compositions identified in Tables 2a, 2b and 2c. The respective activation method and duration and peel strength results are disclosed in Tables 2d, 2e and 2f.

TABLE 2d adhesion mediator composition
method of activation & peel strength on a
polypropylene substrate with respect to Ex. 2-1 to 2-4

|  | Ex. 2-1 | Ex. 2-2 | Ex. 2-3 | Ex. 2-4 |
|---|---|---|---|---|
| Corona discharge [s] | 4.0 | 4.0 | 4.0 | 4.0 |
| Peel strength [N/mm] | 6.0 | 5.3 | 9.2 | 2.9 |

TABLE 2e adhesion mediator composition
method of activation & peel strength on a
polypropylene substrate with respect to Ex. 2-5 to 2-9

|  | Ex. 2-5 | Ex. 2-6 | Ex. 2-7 | Ex. 2-8 | Ex. 2-9 |
|---|---|---|---|---|---|
| Corona discharge [s] | 4.0 | 4.0 | 4.0 | 4.0 | 4.0 |
| Peel strength [N/mm] | 6.1 | 1.9 | 6.3 | 3.3 | 8.2 |

It can be seen that in Tables 2d and 2e that all the examples Ex. 2-1 to 2-9 gave good peel strength results compared to the comparatives.

TABLE 2f

Adhesion mediator composition method of
activation & peel strength using a polypropylene substrate

|  | C. 2-1 | C. 2-2 | C. 2-3 | C. 2-4 |
|---|---|---|---|---|
| Corona discharge [s] | 4.0 | 4.0 | 4.0 | 4.0 |
| Peel strength [N/mm] | ≈0.5 | 0.3 | 0.7 | 0.3 |

It can be seen that in Table 2f that in C2-1 the use of vinyltrimethoxysilane results in a poor peel strength this is thought to be due it's increased reactivity leading to an unstable adhesion mediator. Likewise, a significant reduction in the amount of Pt catalyst present gives a similar peel strength result as does C2-3 shows an increased amount of Polymer 1 relative to the other ingredients.

Example 3

In example 3, an adhesion mediator having the composition depicted as Ex. 2.1 in Table 2a above and which was applied onto polypropylene in accordance with Table 2d above (and depicted again in Table 3a) was compared with using the same adhesion mediator composition on two different polyethylene substrates.

In table 3a the high-density polyethylene (HDPE) utilised was Dow™ HDPE 25055E and the low-density polyethylene (LDPE) was Rocholl Kunststoffprütkörper Simona PEW.

TABLE 3a

Comparison of Ex. 2-1 (polypropylene) with
alternate polyethylene substrates in Ex. 3-2 and 3-3.

|  | Ex. 2-1 | Ex. 3-2 | Ex. 3-3 |
|---|---|---|---|
| Corona discharge (s) | 4.0 | 4.0 | 4.0 |
| Peel strength on PP [N/mm] | 6.0 |  |  |
| Peel strength on HDPE [N/mm] |  | 7.1 |  |
| Lap Shear test on LDPE [N/mm] |  |  | 1.6 |

The floating roller peel test in accordance with ASTM D3167 was utilised again to test Ex. 3-2 on the HDPE substrate as a direct comparison to the test undertaken of Ex. 2-1 in Table 2d. However, this test could not be used with respect to the LDPE substrate because the LDPE plates were too soft and would bend and slide through the roller. Instead, a lap shear test in accordance with ASTM D3163 was undertaken in which the adhesion mediator of Ex. 2-1 in Table 2a was applied to one end of the activated polymer plates (100×25×2 mm$^3$). Afterward, LSR 1 was applied to one end of an activated and coated plate using a spatula. A second activated and coated plate was placed on top of the LSR 1 layer in a lap shear test configuration (the spacing between the two plates, filled with LSR 1, was 2 mm, the overlap between the plates was 15 mm). The lap shear test samples were cured at 105° C. for 35 min, unless otherwise indicated. The adhesion mediator showed high peel/shear strength and cohesive failure irrespective of the polyolefin employed.

Example 4

In example 4, the unaged product of Ex. 2.1 as depicted in Table 2d was compared with identically prepared samples after heat aging. The same activation method for activating the SIMONA™ DWST PP polypropylene substrate composition was used as identified in Table 2d. The initial peel strength in Tables 4a and 4b is that of Ex. 2-1 and the aged samples had their initial peel strength tested after heat aging and heat/humidity exposure the composites prepared as indicated in Tables 4a and 4b. The heat ageing was undertaken using a standard ventilated oven and the heat/humidity testing was undertaken in a Simulationsanlage Messtechnik WK3-340/70 climate chamber from Weiss Umwelttechnik GmbH.

TABLE 4a

Peel strength after Heat Aging at 85° C. and atmospheric conditions

| | Peel Strength [N/mm] |
|---|---|
| Initial (0 days aging) | 6.0 |
| 7 days aging | 7.1 |
| 14 days aging | 7.6 |

TABLE 4b

Peel strength after Heat Aging at 85° C. and 85% Relative Humidity

| | Peel Strength [N/mm] |
|---|---|
| Initial (0 days aging) | 6.0 |
| 7 days aging | 5.9 |
| 14 days aging | 5.7 |

These results showed that peel strengths are maintained and even slightly improved after heating heat ageing in Table 4a. The peel strength results of Table 4b show that peel strength values are also maintained after severe heat/humidity treatment making them promising for household applications where the composites are exposed to heat/water/water vapor.

Example 5

In example 5, the same adhesion mediator composition as depicted as Ex. 2-1 in Table 2a was applied on to a SIMONA™ DWST PP substrate in the same manner as Ex. 2-1 in Table 2d but in this instance alternative commercial liquid silicone rubber compositions were used in Ex. 5-2 to Ex. 5-5 instead of LSR 1.

TABLE 5

Peel strength after overmolding of several alternative LSRs [N/mm]

| | Ex. 2-1 | Ex. 5-2 | Ex. 5-3 | Ex. 5-4 | Ex. 5-5 |
|---|---|---|---|---|---|
| LSR 1 - peel strength [N/mm] | 6.0 | | | | |
| LSR 2 cured at 120° C. - peel strength [N/mm] | | 6.7 | | | |
| LSR 2 cured at 100° C. - peel strength [N/mm] | | | 6.1 | | |
| LSR 3 | | | | Q | |
| LSR 4 | | | | | Q |

In Table 5:
LSR 1 was Silastic™ 3D 3335 LSR,
LSR 2 was Silastic™ LTC 9400-50 LSR,
LSR 3 was Silastic™ NPC 9300-50 LSR and
LSR 4 was Dowsil™ MS-1002 Moldable Silicone.

All of the LSRs tested are commercially available from Dow Silicones Corporation of Midland Michigan, USA. Ex. 5-4 and 5-5 were only qualitatively (Q) tested by trying to pull them apart by hand but were not separable.

It can be seen that in each case acceptable levels of adhesion can be seen to have been achieved given the peel strength values achieved.

Example 6

In example 6 the adhesion mediator depicted as Ex. 2.9 on Table 2b was utilised to assess its ability to assist in the adherence of LSR 1 to three further thermoplastic substrates. The substrates used were three commercial test plates purchased from Rocholl GmbH of Eschelbronn, Germany.

The test plate substrates utilised were Polyamid 6 (Sustamid™ 6) (150×25×2 mm$^3$), A-PET (polyethylene terephthalate) (Makroform™) (60×25×2 mm$^3$) and a polycarbonate (Makrolon™) (60×25×2 mm$^3$).

The thermoplastic substrates were first cleaned with isopropanol. Typically, the isopropanol evaporated immediately but the substrates were left for about 10 minutes at room temperature to dry prior to usage. In the case of the polycarbonate each test plate substrate was subjected to corona discharge activation for four second as described in earlier examples. Thereafter a first test plate of each substrate was then coated with a layer of adhesion mediator composition depicted as Ex. 2-9 composition in Table 2b using a pipette. A continuous layer was provided by then wiping the composition over the surface of the substrate. A second test plate of each substrate was tested as a comparative for which no adhesion mediator was coated onto the surface. First and second test plates of each substrate were then coated with a 2-3 mm layer of LSR which was then cured at 120° C. for 15 min to form a composite. The resulting composites were stored for at least 24 hours before being tested for adhesion. Each composite was qualitatively tested by trying to pull the LSR and substrate apart by hand. It was found in each case that when the test plate had received a layer of adhesion mediator, they were not separable but in comparison the cured LSR on test plate composites which had no adhesion mediator applied was easily peeled off the test plate substrate.

The invention claimed is:
1. An adhesion mediator composition comprising:
   (i) a trialkoxysilane, of the formula Si(OR)$_3$R$^1$, wherein each R may be the same or different and is an alkyl group having at least two carbons per group and each R$^1$ may be the same or different and is an unsaturated group selected from an alkenyl group or an alkynyl group; which trialkoxysilane is present in an amount of from 20 to 45 wt. % of the composition;
   (ii) a platinum group metal based hydrosilylation reaction catalyst;
   (iii) an alkoxy titanium compound having from 2 to 4 alkoxy groups in an amount of from 1 to 10 wt. %;
   (iv) a tetraalkoxysilane, of the formula Si(OR$^2$)$_4$, wherein each R$^2$ may be the same or different and is an alkyl group having at least two carbons per group, which tetraalkoxysilane is present in an amount of from 5 to 20 wt. % of the composition; and
   (v) either
      (a') a polyorganosiloxane containing at least two unsaturated groups, selected from alkenyl groups and alkynyl groups, per molecule, and having a viscosity in a range of 50 mPa·s to 9000 mPa·s using a Brookfield viscometer with an RV-4 spindle at 20 rpm at 25° C.; or (b') a mixture of two or more polyorganosiloxanes containing at least two unsaturated groups, selected from alkenyl groups and alkynyl groups, per molecule, which mixture has a viscosity in a range of 50 mPa·s to 9000 mPa·s using a Brookfield viscometer with an RV-4 spindle at 20 rpm at 25° C.;

wherein component (v) is present in an amount of from 25 to 60 wt. % of the composition.

2. The adhesion mediator composition in accordance with claim 1, wherein component (i) has the formula $Si(OR)_3R^1$ in which each R may be the same or different and is selected from ethyl, propyl, n-butyl isobutyl or t-butyl, and each $R^1$ is an alkenyl group which may be the same or different selected from vinyl, propenyl, n-butenyl, pentenyl or hexenyl.

3. The adhesion mediator composition in accordance with claim 1, wherein component (ii) is one or more co-ordination compounds of platinum.

4. The adhesion mediator composition in accordance with claim 1, wherein component (iii) is one or more alkoxy titanium compounds of the formula $Ti(OR^3)_4$, $Ti(OR^3)_3R^4$, $Ti(OR^3)_2R^4_2$ or a chelated alkoxy titanium molecule wherein $R^3$ is a linear or branched alkyl group having from 1 to 20 carbons, and when present $R^4$ is an alkyl group having from 1 to 10 carbon atoms, an alkenyl group having from 2 to 10 carbon atoms, an alkynyl group having from 2 to 10 carbon atoms, a cycloalkyl group having from 3 to 10 carbon atoms, or an aromatic group having from 6 to 20 carbon atoms or a mixture thereof.

5. The adhesion mediator composition in accordance with claim 4, wherein component (iii) is selected from titanates of the structure $Ti(OR^3)_4$, $Ti(OR^3)_3R^4$, or $Ti(OR^3)_2R^4_2$ wherein each $R^3$ is an isobutyl group, a tertiary butyl group or n-butyl group or component (iii) is an ester of titanic acid and the enolate of acetoacetic ester.

6. The adhesion mediator composition in accordance with claim 1, wherein component (iv) is a tetraalkoxysilane of the formula $Si(OR^2)_4$ wherein each $R^2$ is selected from ethyl, propyl, isopropyl, n-butyl, isobutyl, t-butyl, pentyl or hexyl.

7. A method for the preparation of a silicone elastomer and thermoplastic composite, the method comprising the steps of:

(a) optionally, activating a thermoplastic substrate surface;

(b) treating the optionally activated thermoplastic substrate surface with the adhesion mediator composition in accordance with claim 1;

(c) applying a hydrosilylation curable silicone rubber composition on to the treated surface resulting from step (b); and (d) curing the hydrosilylation curable silicone rubber composition.

8. The method in accordance with claim 7, wherein the thermoplastic substrate is activated by one of plasma treatment, corona discharge treatment, UV-C/ozone irradiation, vacuum-UV irradiation, flame-pyrolytic deposition of amorphous silicon dioxide, or flame treatment.

9. The method in accordance with claim 7, wherein step (c) and/or step (d) involves injection molding or 3-D printing.

10. The method in accordance with claim 7, wherein in step (d) the hydrosilylation curable silicone rubber composition is cured at a temperature below the melt temperature of the thermoplastic substrate.

11. The method in accordance with claim 7, wherein the thermoplastic is a polyolefin.

12. The method in accordance with claim 7, wherein the hydrosilylation curable silicone rubber composition is applied in step (c) before the layer of adhesion mediator applied in step (b) has cured or solidified.

13. A composite article or part obtained from the method in accordance with claim 7.

14. The composite article in accordance with claim 13, which contains a maximum of 50 mg of platinum per kg.

15. The adhesion mediator composition in accordance with claim 1, wherein component (ii) is present in an amount of from 0.1 to 1.5 wt. % of the composition.

* * * * *